United States Patent
Montgomery

(10) Patent No.: US 7,363,336 B1
(45) Date of Patent: Apr. 22, 2008

(54) SIX-TERM KARATSUBA-VARIANT CALCULATOR

(75) Inventor: Peter L. Montgomery, San Rafael, CA (US)

(73) Assignee: Microsoft Corporation, Redmond, WA (US)

(*) Notice: Subject to any disclaimer, the term of this patent is extended or adjusted under 35 U.S.C. 154(b) by 717 days.

(21) Appl. No.: 10/804,726

(22) Filed: Mar. 19, 2004

(51) Int. Cl.
G06F 7/00 (2006.01)

(52) U.S. Cl. ....................................... 708/492
(58) Field of Classification Search ................. 708/492
See application file for complete search history.

(56) References Cited

U.S. PATENT DOCUMENTS

| | | |
|---|---|---|
| 5,999,959 A | 12/1999 | Weng et al. |
| 7,016,927 B2 | 3/2006 | Elbe et al. |
| 7,069,287 B2 | 6/2006 | Paar et al. |
| 2002/0062330 A1 | 5/2002 | Paar et al. |
| 2002/0116428 A1 | 8/2002 | Stribaek et al. |
| 2003/0208518 A1 | 11/2003 | Gura et al. |
| 2004/0078409 A1 | 4/2004 | Stein et al. |
| 2004/0109561 A1 | 6/2004 | Koc et al. |
| 2004/0158597 A1* | 8/2004 | Ye et al. ...................... 708/492 |
| 2005/0086278 A1 | 4/2005 | Jin et al. |

OTHER PUBLICATIONS

Oo et al "Efficient Multiplier Architecture Using Optimized Irreducible Polynomial over GF ((3n)3)", pp. 383-386, 1999 IEEE.*
Paar, "A New Architecture for a Parallel Finite Field Multiplier with Low Complexity Based on Composite Fields", IEEE, vol. 45, No. 7, 1996, pp. 856-861.
Paar, et al., "Efficient Multiplier Architectures for Galois Fields GF(24n)", IEEE, vol. 47, No. 2, 1998, pp. 162-170.

* cited by examiner

Primary Examiner—Tan V. Mai
(74) Attorney, Agent, or Firm—Lee & Hayes, PLLC

(57) ABSTRACT

A technology generally related to large-scale computations is described herein. An implementation, described herein, employs a new and improved variant of the Karatsuba multiplication approach.

22 Claims, 3 Drawing Sheets

SIX-TERM KARATSUBA-VARIANT CALCULATOR

TECHNICAL FIELD

This invention generally relates to technology involving large-scale computations.

BACKGROUND

Multiplying two polynomials (or integers) efficiently is a key issue in a variety of academic fields and practical applications. Examples of such fields and applications include (but are not limited to): signal processing, cryptography, digital security systems, computer science, and number theory.

Multiplication—Classic Schoolbook Style

The conventional (i.e., "classic schoolbook" style) of multiplication in positional number systems requires approximately $c*m*n$ operations to multiply an m-place (e.g., m-digits) number by an n-place (e.g., n-digits) number, for some constant c. When m=n, this conventional procedure for multiplication of two n-place numbers requires an execution time approximately proportional to $n^2$, as n increases. This is sometimes written $O(n^2)$.

Put another way, this classic schoolbook approach of multiplication of two n-digit numbers results in a cost of $n^2$ operations. The overall cost is the number of basic operations (e.g., addition, subtraction, and multiplication of single-digit numbers) required to complete a task; however, often the focus is on the multiplication tasks since they typically require significantly more processing resources than additions and subtractions. The task in this case is the multiplication of two n-digit numbers.

This conventional multiplication approach has many different names. For example, it may be called "brute-force", "long", "classic", and such. Herein, it is referred to as "classic schoolbook" multiplication.

It is also used for the multiplication of polynomials. For example, let n be a positive integer. The "classic schoolbook" way to multiply two univariate polynomials of degree at most n−1 (i.e., with n terms each, some of whose coefficients may be zero) needs $n^2$ multiplications of coefficients. It multiplies each coefficient of one polynomial by each coefficient of the other, adding the products where needed.

If $a(X)=a_1X+a_0$ and $b(X)=b_1X+b_0$ are two linear polynomials in the same variable X, then the "classic schoolbook" approach computes all three coefficients of the product polynomial $a(X)b(X)=a_1b_1X^2+(a_1b_0+a_0b_1)X+a_0b_0$ with four multiplications of the original coefficients, followed by one addition. As discussed later, other approaches need only three coefficient multiplications.

Fast Multiplication—Karatsuba Style

In 1962, A. Karatsuba and Yu. Ofman suggested (in *Doklady Akad. Nauk SSSR* 145 (1963), 293-294) a new multiplication technique that had an overall asymptotic cost less than the classic schoolbook's $O(n^2)$. Since 1962, many variants of Karatsuba have been proposed. This is described further by Donald E. Knuth in his "The Art of Computer Programming", Volume 2, Seminumerical Algorithms, Third Edition, Addison-Wesley 1998). More on the Karatsuba-style multiplication appears in "Generalization of the Karatsuba Algorithm for Efficient Implementations" by André Weimerskirch and Christof Paar (http://www.crypto.ruhr-uni-bochum.de/Publikationen/texte/kaweb.pdf).

In terms of efficiency, the Karatsuba-style multiplication approach (with its existing variants) is an improvement over the classic schoolbook approach. Just like back in 1962 when Karatsuba suggested a new approach, it is still desirable to improve the efficiency (and thus speed) of multiplication.

SUMMARY

A technology generally related to large-scale computations is described herein. For example, one implementation, described herein, may be employed in the fields of cryptography and digital security systems. An implementation, described herein, employs a new and improved variant of the Karatsuba multiplication approach.

BRIEF DESCRIPTION OF THE DRAWINGS

The same numbers are used throughout the drawings to reference like elements and features.

DETAILED DESCRIPTION

Figure 1:
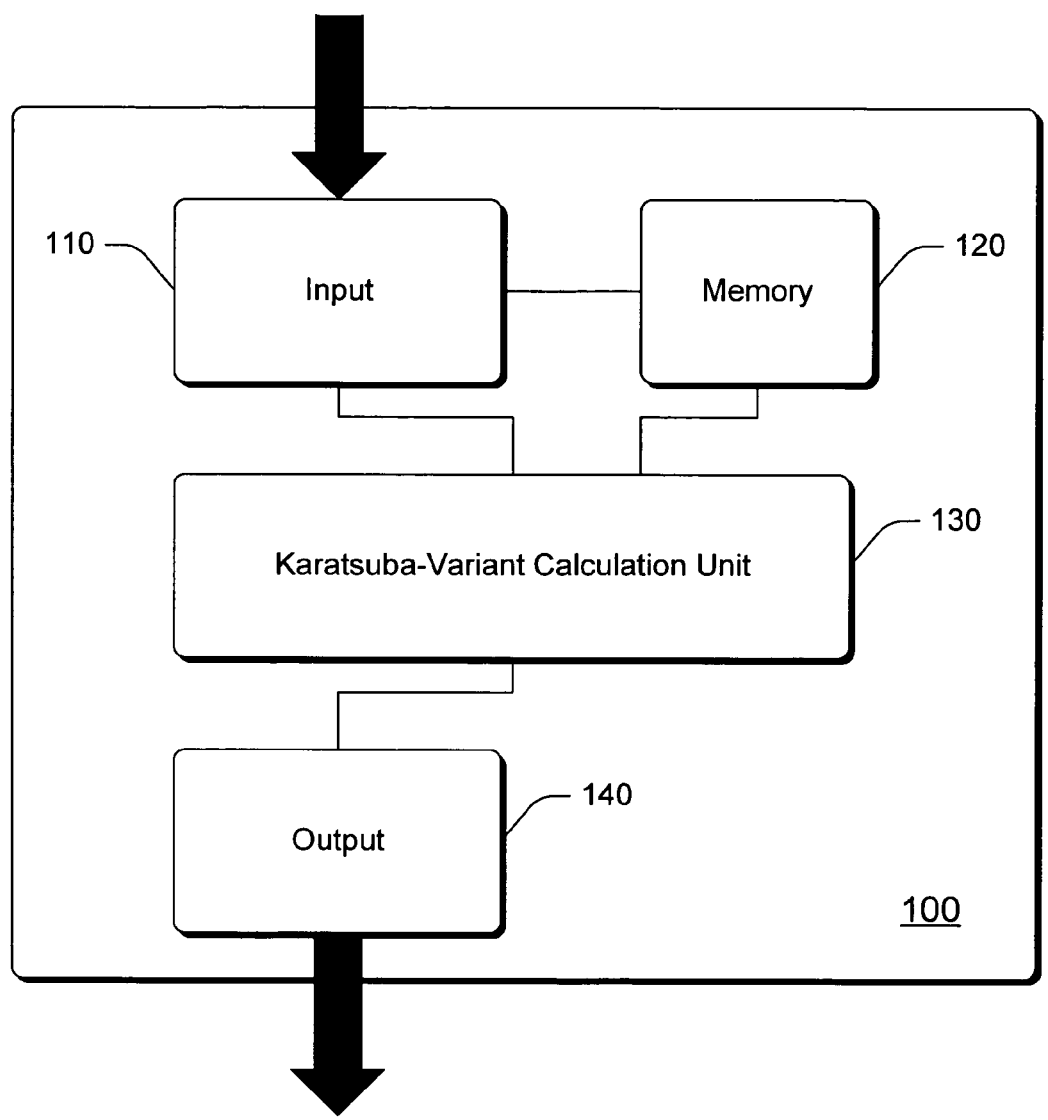
FIG. 1 shows an example of a system that may employ a Karatsuba-variant calculator in accordance with an implementation described herein.

The following description sets forth techniques for performing a six-term Karatsuba-Variant calculation. The techniques may be implemented in many ways, including on computing systems or computer networks, as part of digital security, anti-piracy, cryptography architectures, systems, and/or applications.

An example of an embodiment, described herein, may be referred to as an "exemplary Karatsuba-variant calculator."

Minimum Multiplications Function M(n)

Given a positive integer n, let M(n) denote the minimum number of coefficient multiplications needed to multiply two polynomials of degree at most n−1. Sometimes, polynomials of degree at of degree at most n−1 are described as polynomials having n terms each (where some coefficients may be zero).

M(1)=1 may be described, in words, as multiplication of two constant polynomials, having one term each, that results in a minimum of one coefficient multiplication. This situation is trivial. Since degree-zero polynomials are scalars, one simply multiplies the two scalars.

"Classic Schoolbook" is Not Optimal

The "classic schoolbook" approach shows that $M(n) \leq n^2$ for all n. In particular $M(2) \leq 4$. However we can achieve $M(2) \leq 3$.

Consider the two linear polynomials $$a(X) = a_1 X + a_0 \text{ and } b(X) = b_1 X + b_0$$

in the same variable X. Their product is $$a(X)b(X) = (a_1 X + a_0)(b_1 X + b_0) = a_1 b_1 X^2 + (a_1 b_0 + a_0 b_1)X + a_0 b_0.$$

Instead of computing all four products $a_1 b_1, a_1 b_0, a_0 b_1, a_0 b_0$, one can start with $a_1 b_1$ and $a_0 b_0$. Use the identity $$a_1 b_0 + a_0 b_1 = (a_1 + a_0)(b_1 + b_0) - a_1 b_1 - a_0 b_0.$$

This identity replaces two multiplications (namely, $a_1 b_0$ and $a_0 b_1$) by the single multiplication $(a_1 + a_0)(b_1 + b_0)$ and some additions (herein, "addition" operations also encompass "subtraction" operations).

We can summarize this computation with $$(a_1 X + a_0)(b_1 X + b_0) = \quad [1]$$
$$a_0 b_0(-X + 1) + (a_1 + a_0)(b_1 + b_0)X + a_1 b_1(X^2 - X)$$

Within Equation 1, the $(-X+1)$ factor after $a_0 b_0$ signifies that $a_0 b_0$ appears with a minus sign in the coefficient of $X^1$ and with a plus sign in the coefficient of $X^0 = 1$. The product $(a_1 + a_0)(b_1 + b_0)$ is used only once, with a plus sign in the coefficient of $X^1$. The product $a_1 b_1$ appears with a plus sign in the coefficient of $X^2$ and with a minus sign in the coefficient of $X^1$.

The three products used are $a_0 b_0$, $(a_1 + a_0)(b_1 + b_0)$, and $a_1 b_1$. The first two products are $a(0)b(0)$, the values of the quadratic polynomial $a(X)b(X)$ evaluated at $X = 0$ and $X = 1$. The last product $a_1 b_1$, may be interpreted as $a(\infty)b(\infty)$, the most significant coefficient of the product. The product polynomial (degree at most 2 for this example) is uniquely determined by its values at three distinct points.

By replacing X by −X, $a_1$ by $-a_1$ and $b_1$ by $-b_1$, another formulate is derived that uses only three multiplications:

$$(a_1 X + a_0)(b_1 X + b_0) = \quad [2]$$
$$a_0 b_0(X + 1) + (a_1 - a_0)(b_1 - b_0)(-X) + a_1 b_1(X^2 + X).$$

Higher Degree—$M(n) \leq (n)(n+1)/2$

Let n be an arbitrary positive integer. The technique in the last section generalizes to show $M(n) \leq n(n+1)/2$. Given two input polynomials $$a(X) = \sum_{0 \leq i \leq n-1} a_i X^i \text{ and } b(X) = \sum_{0 \leq j \leq n-1} b_j X^j.$$

of degree at most n−1, the product is $$a(X)b(X) = \sum_{0 \leq i \leq n-1} \sum_{0 \leq j \leq n-1} a_i b_j X^{i+j}$$
$$= \sum_{0 \leq i \leq n-1} a_i b_i X^{2i} + \sum_{0 \leq i < j \leq n-1} (a_i b_j + a_j b_i) X^{i+j}$$

To elaborate further: Once all products of the form $a_i b_i$ are evaluated, each $a_i b_j + a_j b_i$ where $i < j$ may be evaluated using one of the identities $$a_i b_j + a_j b_i = (a_i + a_j)(b_i + b_j) - a_i b_i - a_j b_j$$

or $$a_i b_j + a_j b_i = a_i b_i + a_j b_j - (a_i - a_j)(b_i - b_j).$$

This approach has n products of the form $a_i b_i$ and $$\frac{n(n-1)}{2}$$

of the form $(a_i + a_j)(b_i + b_j)$ or $(a_i - a_j)(b_i - b_j)$, for a combined $$\frac{n(n+1)}{2}$$

products.

Example: n=3

When n=3, this approach achieves 6 scalar multiplication (rather than the 9 multiplications used by the classic schoolbook approach). If we start with $a(X)$ $$= a_2 X^2 + a_1 X + a_0 \text{ and } b(X) = b_2 X^2 + b_1 X + b_0,$$

then the product is $a(X)b(X) =$ $$(a_2 X^2 + a_1 X + a_0)(b_2 X^2 + b_1 X + b_0) =$$
$$a_2 b_2 X^4 + (a_2 b_1 + a_1 b_2) X^3 +$$
$$(a_2 b_0 + a_1 b_1 + a_0 b_2) X^2 + (a_1 b_0 + a_0 b_1) X + a_0 b_0.$$

To compute all five coefficients, start with $a_2 b_2$, $a_1 b_1$, and $a_0 b_0$. Use the technique in the last section three times.

$$a_2 b_1 + a_1 b_2 = (a_2 + a_1)(b_2 + b_1) - a_2 b_2 - a_1 b_1$$
$$a_2 b_0 + a_0 b_2 = (a_2 + a_0)(b_2 + b_0) - a_2 b_2 - a_0 b_0$$
$$a_1 b_0 + a_0 b_1 = (a_1 + a_0)(b_1 + b_0) - a_1 b_1 - a_0 b_0.$$

This construction shows $M(3) \leq 6$.

$$(a_2 X^2 + a_1 X + a_0)(b_2 X^2 + b_1 X + b_0) =$$
$$a_0 b_0 (1 - X - X^2) + a_1 b_1 (-X + X^2 - X^3) +$$
$$a_2 b_2 (-X^2 - X^3 + X^4) + (a_1 + a_0)(b_1 + b_0) X +$$
$$(a_2 + a_0)(b_2 + b_0) X^2 + (a_2 + a_1)(b_2 + b_1) X^3.$$

If we instead use the identities $$a_2b_1+a_1b_2=a_2b_2+a_1b_1-(a_2-a_1)(b_2-b_1)$$

$$a_2b_0+a_0b_2=a_2b_2+a_0b_0-(a_2-a_0)(b_2-b_0)$$

$$a_1b_0+a_0b_1=a_1b_1+a_0b_0-(a_1-a_0)(b_1-b_0),$$

then we end up with $$(a_2X^2 + a_1X + a_0)(b_2X^2 + b_1X + b_0) =$$
$$a_0b_0(1 + X + X^2) + a_1b_1(X + X^2 + X^3) +$$
$$a_2b_2(X^2 + X^3 + X^4) - (a_1 - a_0)(b_1 - b_0)X -$$
$$(a_2 - a_0)(b_2 - b_0)X^2 - (a_2 - a_1)(b_2 - b_1)X^3.$$

Fast Multiplication Via Recursion—Karatsuba Style

So far our bound $M(n) \leq n(n+1)/2$ remains $O(n^2)$, like the $O(n^2)$, time of the "classic schoolbook" method but with a smaller constant factor. Karatsuba and Ofman demonstrated that the asymptotic cost may be improved using recursion when n is composite.

The bound $M(n) \leq n(n+1)/2$ gives $M(4) \leq 10$. The recursive algorithm will show $M(4) \leq M(2)^2 \leq 9$. Consider the two four-term (degree $\leq 3$) polynomials:

$$a(X)=a_3X^3+a_2X^2+a_1X+a_0$$

and $$b(X)=b_3X^3+b_2X^2+b_1X+b_0$$

Letting Y denote $X^2$, these may be rewritten as:

$$a(X,Y)=(a_3X+a_2)Y+(a_1X+a_0)$$

and $$b(X,Y)=(b_3X+b_2)Y+(b_1X+b_0).$$

Note that a(X) originally has 4 terms. Group the degree 2 and degree 3 terms together and factor out an $X^2=Y$. Now a(X) is expressed as a linear polynomial in Y with coefficients which are polynomials in X. Later, Y may be replaced by $X^2$. View the intermediate a(X,Y) and b(X,Y) as linear polynomials in the variable Y, with polynomial coefficients in the variable X.

After doing three multiplications $$(a_3X+a_2)(b_3X+b_2)$$

$$(a_1X+a_0)(b_1X+b_0)$$

$$(a_3X+a_2+a_1X+a_0)(b_3X+b_2+b_1X+b_0)$$

(products of linear polynomials in the variable X) and doing a few more additions (of quadratic polynomials in X), one obtains the polynomial product a(X,Y)b(X,Y). If Y is replaced by $X^2$ and a few more additions are done (by combining terms with the same power of X), then one obtains a(X)b(X). In doing so, one uses only nine multiplications in the base field (or ring), three for each product of two linear polynomials in X. Therefore $M(4) \leq 9$.

EXAMPLE

For example, to form the product a(X) b(X) where $$a(X)=3X^3+X^2+4X+1$$

and $$b(X)=5X^3+9X^2+2X+6,$$

this approach uses three products $$(3X+1)(5X+9)=14X^2=X+9$$

$$(4X+1)(2X+6)=8X^2+26X+6$$

$$(7X+2)(7X+15)=49X^2+119X+30$$

In this example, the polynomial product (3X+1)(5X+9) (for example) needs only the three coefficient multiplications:

$$3\times5=15, (3+1)\times(5+9)=4\times14=56$$

and $$1\times9=9$$

The middle coefficient of that product is $$56-15-9=32.$$

Similar observations apply to the other two products of linear (in X) factors.

At the next level, the middle coefficient is $$49X^2+119X+30)-(15X^2+32X+9)-(8X^226X+6)=26X^2+61X+15$$

and the product a(X) b(X) is (with $Y=X^2$):

$$a(X)b(X) = (15X^2 + 32X + 9)Y^2 + (26X^2 + 61X + 15)Y +$$
$$(8X^2 + 26X + 6)$$
$$= 15X^6 + 32X^5 + (9 + 26)X^4 + 61X^3 + (15 + 8)X^2 +$$
$$26X + 6$$
$$= 15X^632X^5 + 35X^4 + 61X^3 + 23X^2 + 26X + 6.$$

Basis for Recursion—$M(n_1n_2) \leq (M(n_1)M(n_2)$

The last construction illustrates how one can multiply two polynomials each with $n_1n_2$ terms using $M(n_1)$ multiplications of polynomials of with $n_2$ terms, by breaking the input into $n_1$ blocks each of length $n_2$.

A corollary is $M(n_1n_2(\leq M(n_1)M(n_2))$.

In particular, when $n=2^k$ is a power of 2, this recursive technique multiplies two polynomials of degree at most n−1 with $M(2)^k \leq 3^k \approx n^{1.585}$ multiplications rather than the brute-force $n^2=4^k$ multiplications of the classic schoolbook approach.

Lowering the asymptotic exponent from 2 to 1.585 makes an enormous difference when n is large. Even for the modest $n=2^5=32$, this technique uses 243 multiplications rather than 1024, a four-fold improvement. This is a simple example of high-speed multiplication.

So far we have glossed over the number of additions needed. If n is a power of 2 and A(n) denotes the number of coefficient additions needed to multiply two polynomials of degree at most n−1 by this method, then $A(1)=0$ and $$A(2n)=3A(n)+8n-4.$$

The solution is $$A(2^k)=6*3^k-8*2^k+2,$$

approximately six times the number of multiplications used.

Handling Odd Degrees

It is easy to show $$M(2n+1) \leq M(n) + 2M(n+1).$$

Each input polynomial with 2n+1 terms is split into one piece with n terms and one piece with n+1 terms.

Proceeding recursively then gives an overall cost of $O(n^{\lg 3}) \approx O(n^{1.585})$ where lg denotes base-2 logarithm, even if n is not restricted to powers of 2.

Multiplication by Interpolation

Interpolation approaches, such as that described Sections 3.7.3, p.79 of H. J. Nussbaumer ("Fast Fourier Transform and Convolution Algorithms", $2^{nd}$ Ed., Springer-Verlag, Berlin, 1982), give a formula for multiplying two quadratic polynomials with five multiplications (rather than the six multiplications required by the conventional approach) when one of the two input polynomials will be (re)used for several different products. Nussbaumer evaluates the degree-4 product at five values of X (namely at −1, 0, 1, 2, and ∞), interpolating to get the five output coefficients.

However, Nussbaumer's formula requires a division by 6. Such divisions are not allowed in characteristics 2 and 3 algebras. The five points of evaluation are not distinct in characteristics 2 and 3.

Known Upper Bounds on M(n) for Small n

Using the results so far, the following table represents the bounds:

TABLE 1

| n | 2 | 3 | 4 | 5 | 6 | 7 | 8 |
|---|---|---|---|---|---|---|---|
| M(n) ≤ | 3 | 6 | 9 | 15 | 18 | 24 | 27 |
| Reason | * | * | * | 5(5 + 1)/2 or M(2) + 2M(3) | M(2)M(3) | M(3) + 2M(4) | M(2)M(4) |

*= Reason discussed above

These bounds agree with those in Appendix A of Weimerskirch and Paar.

Cryptographic Applications of Polynomial Multiplication

Cryptographic applications of polynomial multiplication include large integer multiplication and finite field arithmetic. We describe those briefly below.

Application to Large Integer Multiplication

Some cryptographic algorithms such as RSA require multiplication of large integers. The inputs may be 1024-bit integers or larger. Typically, these numbers are represented in radix $2^{32}$ or $2^{64}$ within a computer, requiring 32 (=1024/32) or 16 (=1024/64) words to represent each 1024-bit number.

For example, fix a base R and a length n. To multiply two large integers A and B between 0 and $R^n-1$, start with their radix-R representations $$A = \sum_{0 \leq i \leq n-1} a_i R^i \text{ and } B = \sum_{0 \leq j \leq n-1} b_j R^j$$

where $0 \leq a_i < R$ and $0 \leq b_j < R$.

Two polynomials are introduced here:

$$a(X) = \sum_{0 \leq i \leq n-1} a_i X^i \text{ and } b(X) = \sum_{0 \leq j \leq n-1} b_j X^j$$

These polynomials are selected so that A=a(R) and B=b(R). Compute the polynomial product a(X) b(X) and substitute X=R. With those changes, these polynomials may be rewritten:

$$A = a(R) = \sum_{0 \leq i \leq n-1} a_i R^i \text{ and } B = b(R) = \sum_{0 \leq j \leq n-1} b_j R^j$$

Those who are skilled in the art are familiar with additional details necessary to perform this sort of large integer multiplications at this point. Examples of such details are found in Chapter 8 of Alfred V. Aho, John E. Hopcroft, & Jeffrey D. Ullman, "The Design and Analysis of Computer Algorithms", Addison-Wesley, Reading, Mass., 1974.

EXAMPLE

For example, to multiply the two integers A=3141 and B=5926 in radix R=10, one starts with $$a(X) = 3X^3 + X^2 + 4X + 1$$

and $$b(X) = 5X^3 9X^3 + 9X^2 + 2X + 6$$

These polynomial coefficients come directly from the decimal expansions of A and B. As in an earlier example, form the polynomial product $$a(X)b(X) = 15 \, X^6 = X^5 + 35X^4 + 61X^3 30 \, 23X^2 + 26X + 6$$

(nine multiplications of coefficients suffice). Substitute X=10 to get $$AB = a(10)b(10) = 15000000 + 3200000 +$$
$$350000 + 61000 + 2300 + 260 + 6$$
$$= 18613566.$$

Because coefficients of the product of a(X)b(X) may exceed R−1, carry propagation is needed during the final phase. For example, the 6 from 61 in $61X^3$ is added to the 35 from $35X^4$, giving 41—this 1 is part of the product and the 4 is added to the 32 from $32X^5$.

Finite Field Extensions

Another application of polynomials occurs when taking extensions of a finite field. Let p be a prime. Set K=GF(p), the finite field with p elements. Choose an extension degree m>0 and an irreducible polynomial F(X) of degree m over K. The extension $GF(p^m)$ consists of all polynomials of degree at most m−1, with coefficients in the finite ring K.

To multiply two elements of $GF(p^m)$, form their polynomial product (of degree at most 2m−2) and reduce this product modulo F(X), aiming for (close to M(m)) multiplications in the base field K. The filed polynomial F(X) is often chosen to make the reduction step easy (e.g., by having few nonzero coefficients).

Arithmetic in $GF(2^m)$

Today's high-performance computers typically use binary arithmetic, in which each bit has exactly two possible values. Standard approaches for elliptic curve cryptosystems allow arithmetic modulo prime p or over a field $GF(2^m)$. For the purposes of clarity, two encodings for elements of $GF(2^m)$(polynomial basis or normal basis) are allowed herein. A polynomial basis is assumed.

It takes m bits to store an arbitrary element of $GF(2^m)$. On a b-bit computer (where b is typically 32 or 64, but may take other values), these bits fit in n=CEIL(m/b) words. [CEIL(x) rounds its real argument x up to the next integer.] The polynomial basis encoding of a typical field element:

$$\alpha = \Sigma_{0 \leq i \leq m-1} \alpha_i X^i$$

(each $\alpha_i$=0 or 1) can store $\alpha_0$ to $\alpha_{b-1}$ in one b-bit computer word, then $\alpha_b$ to $\alpha_{2b-1}$ in another word, etc. The (high-order) (n−1)-th word uses only m−(n−1) b of its b bits—with the unused bits typically set to zero.

For example, if b=32 and m=163, then n=CEIL(163/32)=6 words suffice to hold an arbitrary element of $GF(2^{163})$ on a 32-bit machine. Five words hold 32 bits each. The sixth word holds 3 bits (coefficients of $X^{160}$ to $X^{162}$), with its other 29 bits unused.

This encoding makes addition of two field elements very easy—it corresponds to n applications of the bitwise exclusive "OR" instruction found on most binary machines (one exclusive OR per word).

Subtraction is the same as addition in this algebra:

$$x+y=x-y$$

for all x, y∈$GF(2^m)$. In particular, $$1+1=0$$

The polynomial multiplication operates on polynomials with b bits per input coefficient. An earlier section described how to multiply two polynomials each with $n_1 n_2$ terms using $M(n_1)$ multiplications of polynomials of degree at most $n_2$−1, by breaking the input into $n_1$ blocks each of length $n_2$. Apply that construction with $n_1$=n and $n_2$=b. Use a specialized method for multiplying two b-term polynomials (stored in b-bit words) over GF(2), invoking that method M(n) times. Pad the original operands with nb−m leading zeros. As in the integer arithmetic section, carry propagation is needed on the outputs since the output coefficients have 2b−1 bits each.

Exemplary Computation System

Figure 3:
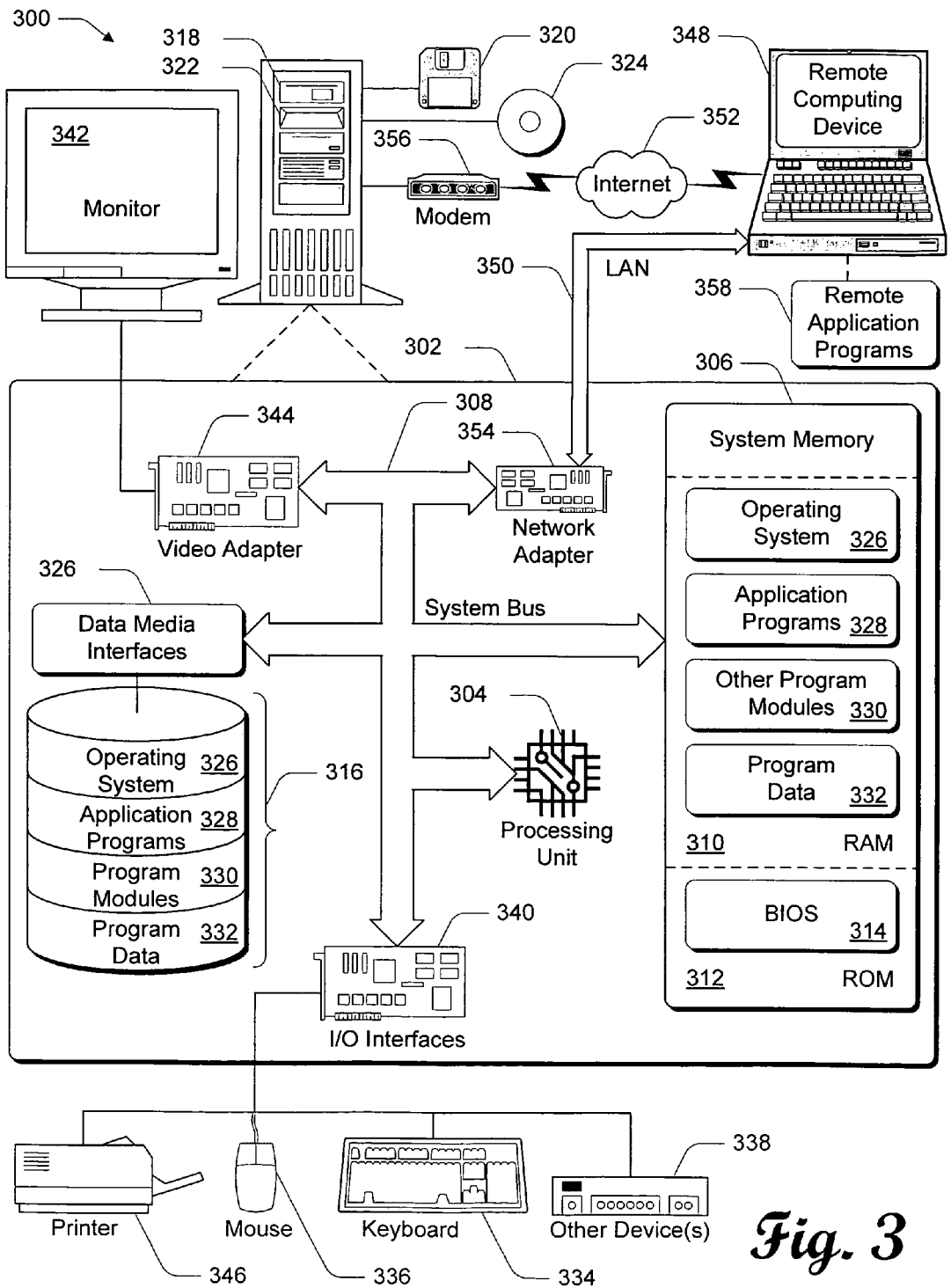
FIG. 3 is an example of a computing operating environment capable of (wholly or partially) implementing at least one embodiment described herein.

The one or more exemplary implementations, described herein, of the present claimed invention may be implemented (in whole or in part) by a Karatsuba-variant calculation unit 130 and/or by a computing environment like that shown in FIG. 3.

Although the exemplary Karatsuba-variant calculator, described herein, is valid in any characteristic, it is especially useful in characteristic 2 or 3,meaning algebras in which $$1+1=0$$

or $$1+1+1=0$$

For an application of characteristic 3 fields to cryptography, see "Implementing the Tate Pairing" by Steven D. Galbraith et al in Algorithmic Number Theory, 5th International Symposium, ANTS V, Sydney Australia, July, 2002, Springer-Verlag LNCS 2369, pp. 324-337.

FIG. 1 shows an example of a computation system 100 that employs the Karatsuba-variant calculation unit 130. Such a system may be used to compute large integers and/or polynomials. It may also be used for multiplication computations in finite field extensions.

The system includes an input unit 110 for receiving the input data to be calculated. It has a memory 120 and the Karatsuba-variant calculation unit 130. It also has an output unit 140 for communicating the results of such calculations.

Pairwise Multiplication

The calculations of the exemplary Karatsuba-variant calculator may be performed recursively. The product of two one-term (i.e., constant polynomials) is found using multiplication in over the ring in which the coefficients lie. But the more complicated ($a_1 X + a_0$)($b_1 X + b_0$) requires three products, namely $a_0 b_0$, $a_1 + a_0$) ($b_1 + b_0$), and $a_1 b_1$.

These three products are done by invoking the algorithm recursively. As we do so, we append the three pairs of inputs ($a_0$, $b_0$), ($a_1 + a_0$, $b_1 + b_0$), and ($a_1$, $b_1$) to a queue of products we're waiting on. The subsequent processing of these pairs may insert additional entries in the waiting list. Once all three products have been completed, the procedure which queued them can complete its task.

Exemplary Karatsuba-Variant Calculator

The Karatsuba-variant calculation unit 130 of the computation system 100 employs an improved variant of the Karatsuba multiplication approach. More specifically, the Karatsuba-variant calculation unit 130 employs the exemplary Karatsuba-variant calculator, as described herein, which is generalized for any n-digit number or n-term polynomial, where n is a positive integer.

The exemplary Karatsuba-variant calculator herein has one or more embodiments to multiply pairs of polynomials with six terms each i.e., pairs of polynomials of degree at most 5). It achieves M(6)≦17, compared with the M(6)≦18 in Table 1 above. These embodiments may work in arbitrary characteristic—all coefficients are integers, so there are no divisions. Like the original Karatsuba, it does not assume multiplication is commutative. These embodiments may be used in recursive constructions to achieves, for example, $$M(11) \leq M(5) + 2M(6) \leq 15 + 2*17 = 49,$$

$$M(12) \leq M(2)M(6) \leq 3*17 = 51,$$

$$M(13) \leq M(6) + 2M(7) \leq 17 + 2*24 = 65,$$

$$M(36) \leq M(6) \leq 17*17 = 289.$$

All of these beat the M(n)≦n(n+1)/2 bound.

Recursive use hereof yields $M(6^k) <= 17^k$ for large k. This yields an asymptotic bound $M(n) = O(n^c)$ with c=log(17)/log(6)≈1.58125. This beat's the original Karatsuba exponent log(3)/log(2)≈1.58496.

Six-Term Karatsuba-Variant Calculator Using ≦17 Multiplications

The following describes a particular embodiment of the Karatsuba-variant calculator. In particular, the embodiment described is one for two polynomials with six terms. Therefore, this may be called an exemplary 6-term Karatsuba-variant calculator.

This approach reduces the asymptotic behavior from $n^{1.585}$ to $n^{1.581}$ (where $$1.585 = ln(3)/ln(2)$$

and $$1.581 = ln(17)/ln(6)).$$

Two polynomials in the variable X, each with degree at most 5 (i.e., 6-term polynomials in X) are described as follows:

$$a(X) = a_0 + a_1 X + a_2 X^2 + a_3 X^3 + a_4 X^4 + a_5 X^5 \quad [3]$$

and $$b(X) = b_0 + b_1 X + b_2 X^2 + b_3 X^3 + b_4 X^4 + b_5 X^5 \quad [4]$$

Given that description of the 6-term polynomials and letting C be an arbitrary (polynomial) value, the equation for the exemplary 6-term Karatsuba-variant calculator is $$\begin{aligned}
a(X)b(X) = &(a_0+a_1+a_2+a_3+a_4+a_5)(b_0+b_1+b_2+b_3+b_4+b_5)\\
&C+(a_1+a_2+a_4+a_5)(b_1+b_2+b_4+b_5)(-C+X^6)+(a_0+\\
&a_1+a_3+a_4)(b_0+b_1+b_3+b_4)(-C+X^4) +(a_0-a_2-a_3+\\
&a_5)(b_0-b_2b_3+b_5)(C-X^7+X^6-X^5+X^4-X^3)+(a_0-a_2-\\
&a_5)(b_0-b_2-b_5)(C-X^5+X^4-X^3)+(a_0+a_3-a_5)(b_0+\\
&b_3-b_5)(C-X^7+X^6-X^5)+(a_0+a_1+a_2)(b_0+b_1+b_2)\\
&(C-X^7+X^6-2X^5+2X^4-2X^3+X^2)+(a_3+a_4+a_5)(b_3+\\
&b_4+b_5)(C+X^8-2X^7+2X^5-2X^6-2X^5+X^4-X^3)+(a_2+\\
&a_3)(b_2+b_3)(-2C+X^7-X^6+2X^5-X^4+X^3)+(a_1-a_4)\\
&(b_1-b_4)(-C+X^4-X^5+X^6)+(a_1+a_2)(b_1b_2)(-C+X^7-\\
&2X^6+2X^5-2X^4+3X^3-X^2)+(a_3+a_4)(b_3+b_4)(-C-X^8+\\
&3X^7-2X^62X^5-2X^4+X^3)+(a_0+a_1)(b_0+b_1)(-C+X^7-\\
&X^62X^5-3X^4+2X^3-X^2+X)+(a_4+a_5)(b_4b_5)(-C+X^9-\\
&X^8+2X^7-3X^6+2X^5-X^4+X^3)+a_0b_0(-3C+2X^7-2X^7-\\
&2X^6+3X^5-2X^4+2X^3-X+1)+a_1b_1(3C-X^7-X^5+X^4-\\
&3X^3+2X^2-X)+a_4b_4(3C-X^9+2X^8-3X^7+X^6-X^5-\\
&X^3)+a_5b_5(-3C+X^{10}-X^9+2X^7-2X^6+3X^5-2X^4+2X^3)\\
\end{aligned} \quad [5]$$

There are 18 products involving a's and b's, but only 17 of them need be computed, by adapting the polynomial parameter C. For example, if C=0 there is no need to compute $(a_0+a_1+a_2+a_3+a_4+a_5)(b_0+b_1+b_2+b_3+b_4+b_5)$.

One C has been chosen so a multiplier vanishes, one can group the coefficients of each power of X, expressing each coefficient of the product as a linear combination of the 17 remaining products.

Methodological Implementation of the Exemplary Karatsuba-Variant Calculator

Figure 2:
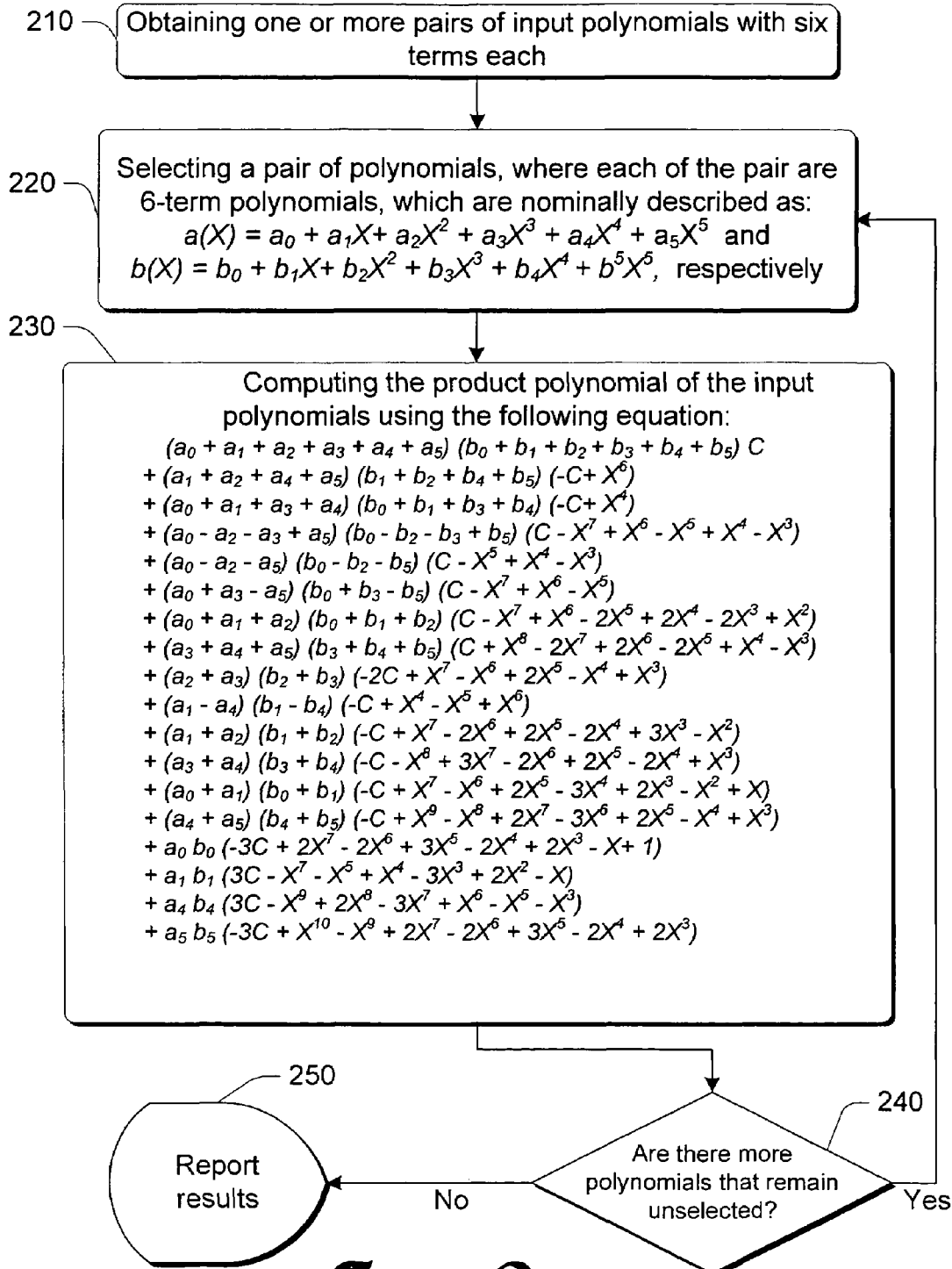
FIG. 2 is a flow diagram showing a methodological implementation described herein.

FIG. 2 shows methodological implementation of the exemplary Karatsuba-variant calculator performed by the Karatsuba-variant calculation unit 130 (or some portion thereof). This methodological implementation may be performed in software, hardware, or a combination thereof. This methodological implementation may be performed in software, hardware, or a combination thereof. For ease of understanding, the method steps are delineated as separate steps; however, these separately delineated steps should not be construed as necessarily order dependent in their performance.

At 210 of FIG. 2, the exemplary Karatsuba-variant calculator obtains pairs of input polynomials with a maximum of 6 terms each. There may be only two polynomials or a pair from a collection of pairs.

At 220, it selects one pair of input polynomials, where the two input 6-term polynomials are nominally labeled in accordance with Equations 3 and 4 above.

If the polynomials have a degree other than 5, then they may be processed by other portions of the calculation unit 130 which are configured specifically for polynomials having that degree. Furthermore, polynomials having a degree greater than 5 may be broken down into multiple polynomials where at least one of them has a degree of 5.

At 230, the exemplary Karatsuba-variant calculator computes the product polynomial of these two input 6-term polynomials. It does so by using Equation 5 above to calculate the product polynomial, after choosing C.

At 240, it determines whether any pairs of polynomials remain unselected. If so, then it returns to block 220 to repeat the functions of blocks 220, 230, and 240 for another pair of input polynomials.

If none remain unselected, then it reports the results (product polynomial) at 250.

Exemplary Computing System and Environment

FIG. 3 illustrates an example of a suitable computing environment 300 within which an exemplary Karatsuba-variant calculator, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary Karatsuba-variant calculator may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, smart cards, multiprocessor systems, mobile phones, microprocessor-based systems, set-top boxes, smart cards, programmable consumer electronics, network PCs, minicomputers, mainframe computers, distributed computing environments that include any of the above systems or devices, and the like.

The exemplary Karatsuba-variant calculator may be described in the general context of computer-executable instructions, such as program modules, being executed by a computer. Generally, program modules include routines, programs, objects, components, data structures, etc. that performs particular tasks or implement particular abstract data types. The exemplary Karatsuba-variant calculator may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, by are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architecture. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media may be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 may be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 316, magnetic disk 320, optical disk 324, ROM 312, and/or RAM 310, including by way of example, an operating system 326, and one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components such as speakers (not shown) and a printer 346 which may be connected to computer 302 via the input/output interfaces 340.

Computer 302 may operate in a networked environment using logical connections to one or more remote computers, such as a remote computing device 348. By way of example, the remote computing device 348 may be a personal computer, portable computer, a server, a router, a network computer, a peer device or other common network node, and the like. The remote computing device 348 is illustrated as a portable computer that may include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Computer-Executable Instructions

An implementation of an exemplary Karatsuba-variant calculator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary Karatsuba-variant calculator may be implemented. Specifically, the exemplary Karatsuba-variant calculator(s) described herein may be implemented (wholly or in part) by any program modules 328-330 and/or operating system 326 in FIG. 3 or a portion thereof.

The operating environment is only an example of a suitable operating environment and is not intended to suggest any limitation as to the scope or use of functionality of the exemplary Karatsuba-variant calculator(s) described herein. Other well known computing system, environments, and/or configurations that are suitable for use include, but are not limited to, personal computers (PCs), server computers, hand-held or laptop devices, multiprocessor systems, microprocessor-based systems, smart cards, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary Karatsuba-variant calculator may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, smart cards, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium having computer-executable instructions for securing data that, when executed by a computer, performs acts comprising:

obtaining two input polynomials each with degree 5, wherein a first polynomial is nominally described as $a(X)=a_0a_1X+a_2X^2+a_3X^3+a_4X^4+a_5X^5$ and a second polynomial is nominally described as $b(X)=b_0+b_1X+b_2X^2+b_3X^3+b_4X^4+b_5X^5$ and terms $a_5$ and $b_5$ are non-zero values;

computing a product polynomial of the input polynomials, wherein the total number of coefficient multiplication operations is fewer than or equal to seventeen, wherein during the computing, calculating:

$(a_0+a_1+a_2+a_3+a_4+a_5)(b_0+b_1+b_2+b_3+b_4+b_5)C+(a_1+a_2+a_4+a_5)(b_1+b_2+b_4+b_5)(-C+X^6)+(a_0+a_1+a_3+a_4)(b_0+b_1+b_3+b_4)(-C+X^4)+(a_0-a_2-a_3+a_5)$ $(b_0-b_2-b_3+b_5)(C-X^7+X^6-X^5+X^4-X^3)+(a_0-a_2-a_5)(b_0-b_2-b_5)(C-X^5+X^4-X^3)+(a_0+a_3-a_5)(b_0+b_3-b_5)(C-X^7+X^6-X^5)+(a_0+a_1+a_2)(b_0+b_1+b_2)$ $(C-X^7+X^6-2X^5+2X^4-2X^3+X^2)+(a_3+a_4+a_5)(b_3+b_4+b_5)(C+X^8-2X^7+2X^6-2X^5+X^4-X^3)+(a_2+a_3)(b_2+b_3)(-2C+X^7-X^6+2X^5-X^4+X^3)+(a_1-a_4)(b_1-b_4)$ $(-C+X^4X^5X^6)+(a_1+a_2)(b_1+b_2)(-C+X^7-2X^6-2X^5-2X^4+3X^3-X^2)+(a_3+a_4)(b_3+b_4)(-C-X^8+3X^7-2X^{6+}2X^5-2X^4+X^3)+(a_0+a_1)(b_0+b_1)$ $(-C+X^7-X^6+2X^5-3X^4+2X^3-X^2+X)+(a_4+a_5)(b_4+b_5)(-C+X^9-X^8+2X^7-3X^6+2X^5-X^4+X^3)+a_0b_0(-3C+2X^7-2X^6+3X^5-2X^4+2X^3-X+1)+a_1b_1(3C-X^7-X^5+X^4-3X^3+2X^2-X)+a_4b_4(3C-X^9+2X^8-3X^7+X^6-X^5-X^3)+a_5b_5(-3C+X^{10}-X^9+2X^7-2X^6+3X^5-2X^4+2X^3)$ to compute the product polynomial;

reporting results of the computing, whereby the computed results facilitate data security.

2. A medium as recited in claim 1 further comprising repeating the obtaining and the computing.

3. A medium as recited in claim 1 further comprising:
selecting a pair of polynomials from a collection of pairs and providing the selected polynomials to the obtaining;
repeating the selecting, obtaining, and computing.

4. A medium as recited in claim 1, wherein the variable X is replaced by its negative (−X) and the odd-indexed coefficients, $a_1$, $a_3$, $a_5$, $b_1$, $b_3$, $b_5$, are replaced by their negatives.

5. A medium as recited in claim 1, wherein the computing is performed in a finite field of characteristic 2, with each even coefficient replaced by zero and each odd coefficient replaced by one.

6. A medium as recited in claim 1, wherein the computing is performed in a finite field of characteristic 3, with each coefficient in claim 1 replaced by its modulo 3 image 0, 1 or −1.

7. A medium as recited in claim 1, wherein the computing is performed in a finite field of characteristic 3, with each coefficient in claim 1 replaced by its modulo 3 image 0, 1 or −1.

8. A medium as recited in claim 1 further comprising repeating the obtaining and the computing.

9. A medium as recited in claim 1 further comprising:
 selecting a pair of polynomials from a collection of one or more pairs of polynomials and providing the selected polynomials to the obtaining;
 repeating the selecting, obtaining, and computing.

10. A medium as recited in claim 1, wherein the total number of coefficient multiplication operations performed during the computing is fewer than or equal to seventeen.

11. A medium as recited in claim 1, wherein the two input polynomials are representative of integers base R and a length n and wherein X=R in the calculating.

12. A medium as recited in claim 1, wherein C is zero.

13. A computing device for securing data comprising:
 an audio/visual output;
 a computer-readable medium having computer-executable instructions that, when executed by a computer, performs acts comprising:
  obtaining two input polynomials each with degree 5, wherein a first polynomial is nominally described as $a(X) = a_0 + a_1 X + a_2 X^2 + a_3 X^3 + a_4 X^4 + a_5 X^5$ and a second polynomial is nominally described as $b(X) = b_0 + b_1 X + b_2 X^2 + b_3 X^3 + b_4 X^4 + b_5 X^5$ and terms $a_5$ and $b_5$ are non-zero values;
  computing a product polynomial of the input polynomials, wherein the total number of coefficient multiplication operations is fewer than or equal to seventeen, wherein during the computing, calculating;

$(a_0+a_1+a_2+a_3+a_4+a_5)(b_0+b_1+b_2+b_3+b_4+b_5)C+(a_1+a_2+a_4+a_5)(b_1+b_2+b_2+b_4+b_5)(-C+X^6)+(a_0+a_1+a_3+a_4)(b_0+b_1+b_3+b_4)(-C+X^4)+(a_0-a_2-a_3+a_5)(b_0-b_2-b_3+b_5)(C-X^7+X^6-X^5+X^4-X^3)+(a_0-a_2-a_5)(b_0-b_2-b_5)(C-X^5+X^4-X^3)+(a_0+a_3-a_5)(b_0+b_3-b_5)(C-X^7+X^6-X^5)+(a_0+a_1+a_2)(b_0+b_1+b_2)\ (C-X^7+X^6-2X^5+2X^4-2X^3+X^2)+(a_3+a_4+a_5)(b_3+b_4+b_5)(C+X^8-2X^7+2X^6-2X^5-X^4-X^3)+(a_2+a_3)(b_2+b_3)(-2C+X^7-X^6+2X^5-X^4+X^3)+(a_1-a_4)(b_1-b_4)\ (-C+X^4-X^5+X^6)+(a_1+a_2)(b_1+b_2)(-C+X^7-2X^6+2X^5-2X^4+3X^3-X^2)+(a_3+a_4)(b_3+b_4)(-C-X^8+3X^7-2X^6+2X^5-2X^4+X^3)+(a_0+a_1)(b_0+b_1)\ (-C+X^7-X^6+2X^5-3X^4+2X^3-X^2+X)+(a_4+a_5)(b_4+b_5)(-C+X^9-X^8+2X^7-3X^6+2X^5-X^4+X^3)+a_0b_0(-3C+2X^7-2X^6+3X^5-2X^4+2X^3-X+1)+a_1b_1(3C-X^7-X^5+X^4-3X^3+2X^2-X)+a_4b_4(3C-X^9+2X^8-3X^7+X^6-X^5-X^3)+a_5b_5(-3C+X^{10}-X^9+2X^7-2X^6+3X^5-2X^4+2X^3)$ to compute the polynomial;

to compute the product polynomial;
 reporting results of the computing, whereby the computed results facilitate data security.

14. A computer-implemented method for securing data comprising:
 obtaining two input polynomials with six terms each, wherein a first polynomial is nominally described as $a(X) = a_0 + a_1 X + a_2 X^2 + a_3 X^3 + a_4 X^4 + a_5 X^5$ and a second polynomial is nominally described as $b(X) = b_0 + b_1 X + b_2 X^2 + b_3 X^3 + b_4 X^4 + b_5 X^5$ and terms $a_5$ and $b_5$ are non-zero values;
 computing a product polynomial of the input polynomials, wherein the total number of coefficient multiplication operations is fewer than or equal to seventeen, wherein during the computing, calculating:

$(a_0+a_1+a_2+a_3+a_4+a_5)(b_0+b_1+b_2+b_3+b_4+b_5)C+(a_1+a_2+a_4+a_5)(b_1+b_2+b_4+b_5)(-C+X^6)+(a_0+a_1+a_3+a_4)(b_0+b_1+b_3+b_4)(-C+X^4)+(a_0-a_3-a_3-a_5)\ (b_0-b_2-b_3+b_5)(C-X^7+X^6-X^5+X^4-X^3)+(a_0-a_2-a_5)(b_0-b_2-b_5)(C-X^5+X^4-X^3)+(a_0+a_3-a_5)(b_0+b_3-b_5)(C-X^7+X^6-X^5)+(a_0+a_1+a_2)(b_0+b_1+b_2)\ (C-X^7+X^6-2X^5+2X^4-2X^3+X^2)+(a_3+a_4+a_5)(b_3+b_4+b_5)(C+X^8-2X^7+2X^6-2X^5+X^4-X^3)+(a_2+a_3)(b_2+b_3)(-2C+X^7X^6+2X^5-X^4+X^3)+(a_1-a_4)(b_1-b_4)\ (-C+X^4-X^5+X^6)+(a_1+a_2)(b_1+b_2)(-C+X^7 2X^6+2X^5-2X^4+3X^3-X^2)+(a_3+a_4)(b_3+b_4)(C-X^8+3X^7-2X^6+2X^5-2X^4+X^3)+(a_0+a_1)(b_0+b_1)\ (-C+X^7-X^6 2X^5-3X^4+2X^3-X^2+X)+(a_4+a_5)(b_4+b_5)(-C+X^9-X^8+2X^7-3X^6+2X^5-X^4+X^3)+a_0b_0(-3C+2X^7-2X^6+3X^5-2X^4+2X^3-X+1)+a_1b_1(3C-X^7-X^5+X^4-3X^3+2X^2-X)+a_4b_4(3C-X^9+2X^8-3X^7+X^6-X^5-X^3)+a_5b_5(-3C+X^{10}-X^9+2X^7-2X^6+3X^5-2X^4+2X^3)$ to compute the product polynomial;

reporting results of the computing, whereby the computed results facilitate data security.

15. A computer-implemented method as recited in claim 14 further comprising repeating the obtaining and the computing.

16. A computer-implemented method as recited in claim 14 further comprising:
 selecting a pair of polynomials from a collection of one or more pairs of polynomials and providing the selected polynomials to the obtaining;
 repeating the selecting, obtaining, and computing.

17. A computer-implemented method as recited in claim 14, wherein the variable X is replaced by its negative (−X) and the odd-indexed coefficients, $a_1, a_3, a_5, b_1, b_3, b_5$, are replaced by their negatives.

18. A computer-implemented method as recited in claim 14, wherein the computing is performed in a finite field of characteristic 2, with each even coefficient replaced by zero and each odd coefficient replaced by one.

19. A computer-implemented method as recited in claim 14, wherein the computing is performed in a finite field of characteristic 3, with each coefficient in claim 14 replaced by its modulo 3 image 0, 1, or −1.

20. A system facilitating cryptographic security, the system comprising:
 a memory comprising a set of computer program instructions; and
 a processor coupled to the memory, the processor being configured to execute the computer program instructions, which comprise:
  obtaining two input polynomials with six terms each, wherein a first polynomial is nominally described as $a(X) = a_0 + a_1 X + a_2 X^2 + a_3 X^3 + a_4 X^4 + a_5 X^5$ and a second polynomial is nominally described as $b(X) = b_0 + b_1 X + b_2 X^2 + b_3 X^3 + b_4 X^4 + b_5 X^5$ and terms $a_5$ and $b_5$ are non-zero values;
  computing a product polynomial of the input polynomials, wherein the total number of coefficient multiplication operations is fewer than or equal to seventeen, wherein during the computing, calculating;

$(a_0+a_2+a_3+a_4+a_5)(b_0+b_1+b_2+b_3+b_4+b_5)C+(a_1+a_2+a_4+a_5)(b_1+b_2+b_4+b_5)(-C+X^6)+(a_0+a_1+a_3+a_4)(b_0+b_1+b_3+b_4)(-C+X^4)+(a_0-a_2-a_3+a_5)\ (b_0-b_2-b_3+b_5)(C-X^7+X^6-X^5+X^4-X^3)+(a_0-a_2-a_5)(b_0-b_2-b_5)(C-X^5+X^4-X^3)+(a_0+a_3-a_5)(b_0+b_3-b_5)(C-X^7+X^6-X^5)+(a_0+a_1+a_2)(b_0+b_1+b_2)\ (C-X^7+X^6-2X^5+2X^4-2X^3X^2)+(a_3+a_4+a_5)(b_3+b_4+b_5)(C+X^8-2X^7+2X^6-2X^5+X^4-X^3)+(a_2+a_3)(b_2+b_3)(-2C+X^7-X^6+2X^5-X^4+X^3)+(a_1-a_4)(b_1-b_4)\ (-C+X^4-$ $X^5+X^6)+(a_1+a_2)(b_1+b_2)(-C+X^7-2X^6+2X^5-2X^4+3X^3-X^2)+(a_3+a_4)(b_3+b_4)(-C-X^8+3X^7-2X^6+2X^5-2X^4+X^3)+(a_0+a_1)(b_0+b_1)\quad(-C+X^7-X^6+2X^5-3X^4+2X^3-X^2+X)+(a_4+a_5)(b_4+b_5)(-C+X^9-X^8+2X^7-3X^6+2X^5-X^4+X^3)+a_0b_0(-3C+2X^7-2X^6+3X^5-2X^4-2X^3-X+1)+a_1b_1(3C-X^7-X^{5+X4}-3X^3+2X^2-X)+a_4b_4(3C-X^9+2X^8-3X^7+X^6-X^5-X^3)+a_5b_5(-3C+X^{10}-X^9+2X^7-2X^6+3X^5-2X^4+2X^3)$ to compute the product polynomial;

reporting results of the computing, whereby the computed results facilitate data security.

21. A system as recited in claim 20, wherein the variable X is replaced by its negative (−X) and the odd-indexed coefficients, $a_1$, $a_3$, $a_5$, $b_1$, $b_3$, $b_5$, are replaced by their negatives.

22. A system as recited in claim 20, wherein the computing is performed in a finite field of characteristic 2, with each even coefficient replaced by zero and each odd coefficient replaced by one.

* * * * *